(No Model.)

A. HAID.
ELECTRIC BATTERY.

No. 315,937. Patented Apr. 14, 1885.

WITNESSES:
Jos. H. Rosenbaum.
Otto Risch.

INVENTOR
Alfred Haid
BY Goepel & Raegener
ATTORNEYS.

UNITED STATES PATENT OFFICE.

ALFRED HAID, OF RAHWAY, NEW JERSEY, ASSIGNOR TO THE EXCELSIOR ELECTRIC APPARATUS COMPANY, OF NEW YORK, N. Y.

ELECTRIC BATTERY.

SPECIFICATION forming part of Letters Patent No. 315,937, dated April 14, 1885.

Application filed September 6, 1884. (No model.)

*To all whom it may concern:*

Be it known that I, ALFRED HAID, of Rahway, in the county of Union and State of New Jersey, have invented certain new and useful Improvements in Electric Batteries, of which the following is a specification.

This invention has reference to an improved electric battery for pocket use, to be employed for supplying electric currents for small incandescent lamps in scarf-pins, hair-pins, and other ornamental articles; and the invention consists of a rubber jar divided by transverse partitions into a number of cells in which the electrodes and exciting-liquids are placed. The negative electrode is made of a silver plate and bent so as to form a lining of the cell. The positive electrode is composed of a zinc plate that is retained at the lower part of the cell by a ring with radial arms, and that is attached to the jar by a hermetically-closing screw-stopper. The positive electrode passes through the stopper, and is connected at its upper end electrically with a projecting portion of the negative electrode of the adjoining cell.

Figure 1:
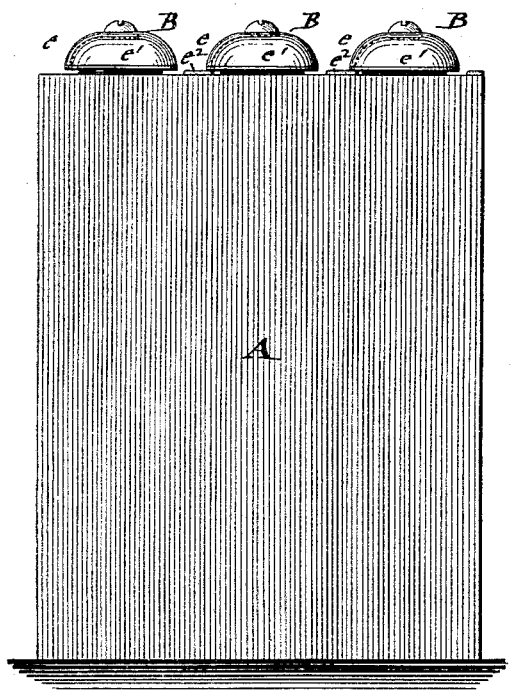
Figure 3:
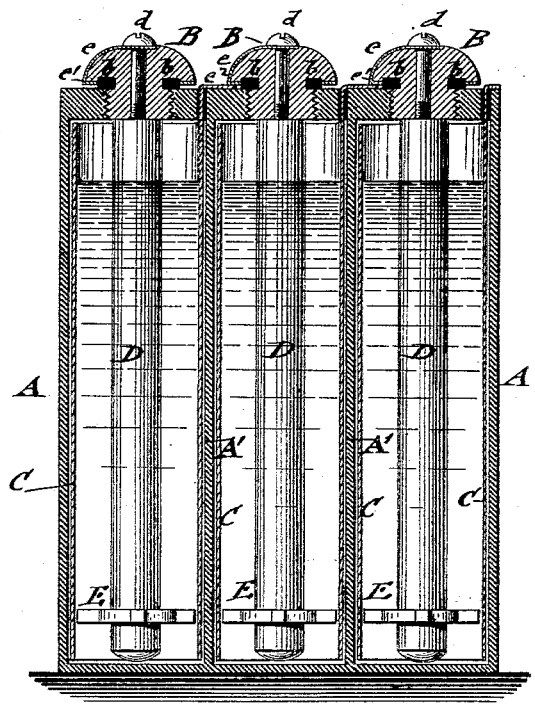
Figure 2:
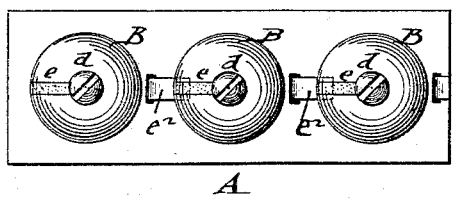

In the accompanying drawings, Figure 1 represents a side elevation of my improved portable electric battery. Fig. 2 is a plan of the same. Fig. 3 is a vertical longitudinal section, and Fig. 4 a horizontal section, of the same.

Similar letters of reference indicate corresponding parts.

Figure 4:
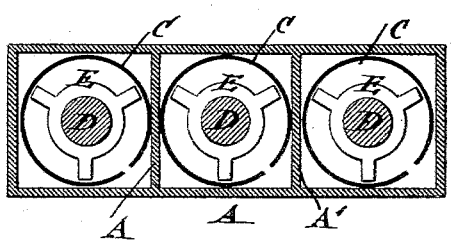

A in the drawings represents a jar, which is made of hard rubber, of such a size that it can be conveniently carried in the pocket. The jar A is provided with transverse partitions A', by which it is divided into two or more cells. The top of the jar A is provided with an opening for each cell, which openings are closed by hermetically-sealing screw plugs or stoppers B. Each cell is provided with a negative electrode, C, of metallic silver or other metal, which is bent in the shape of a tube, and forms a lining of the cell. The positive electrode D is composed of a zinc rod, which is screwed or otherwise fastened to a central screw-post, $d$, of the stopper B. A suitable packing-ring, $b$, secures the tight closing of the stopper B. The electrodes are excited by a solution of bisulphate of mercury in diluted sulphuric acid, or by any other exciting solution. The lower end of the positive electrode D is retained in central position in the cells by a ring, E, fitted to the electrode D, and provided with radial arms, as shown in Figs. 3 and 4.

The electric connection of the electrodes C and D is made by a metallic band, $e$, which connects the outer end of the screw-post $d$ of the stopper B with a circumferential metallic band, $e'$, that is set flush into the lower edge of the stopper and placed in metallic contact with the projecting end $e^2$ of the negative (silver) electrode of the next adjoining cell, when the stopper is closed down tight, as shown in Figs. 2 and 3. In this manner all the cells are thrown into circuit by the tight closing of the stoppers without any exterior binding posts and wires. At the top or side of the jar A is arranged a suitable switch, by which two or more cells can be thrown into circuit, according to the number and size of the miniature incandescent lamps to be lighted. When the stoppers are tightly closed, electric connection is established between the different cells of the battery. The whole forms a compact portable battery, which can be conveniently carried in the pocket, and which is not liable to spill the contents, so as to soil the clothes.

Having thus described my invention, I claim as new and desire to secure by Letters Patent—

1. A portable electric battery consisting of a jar having partitions forming cells, negative electrodes forming the lining of the cells, screw-stoppers closing the openings of the jar, and positive electrodes attached to the stoppers and connected electrically with the negative electrodes of the adjoining cells, substantially as set forth.

2. The combination of a jar having partitions forming cells, negative electrodes forming the lining of the cells, screw-stoppers closing the top openings of the cells, positive electrodes attached to the stoppers and passed centrally through the same, means for holding the lower ends of the positive electrodes in position, and means whereby the positive electrode of one cell is electrically connected with the negative electrode of the adjoining cell, substantially as set forth.

3. The combination of a jar having transverse partitions forming cells, negative electrodes forming the lining of the cells, detaching screw-stoppers having center posts and circumferential contact-rims connected by metallic bands to said center posts, said rims forming contact with the exterior pole ends of the negative electrodes, and positive electrodes attached to said center-posts, substantially as set forth.

In testimony that I claim the foregoing as my invention I have signed my name in presence of two subscribing witnesses.

ALFRED HAID.

Witnesses:
PAUL GOEPEL,
SIDNEY MANN.